United States Patent
Iyengar et al.

(10) Patent No.: US 6,728,344 B1
(45) Date of Patent: *Apr. 27, 2004

(54) EFFICIENT COMPRESSION OF VROM MESSAGES FOR TELEPHONE ANSWERING DEVICES

(75) Inventors: Vasu Iyengar, Allentown, PA (US); Peter Kroon, Green Brook, NJ (US)

(73) Assignee: Agere Systems Inc., Allentown, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,773

(22) Filed: Jul. 16, 1999

(51) Int. Cl.⁷ .............................................. H04M 1/64
(52) U.S. Cl. .................... 379/88.1; 379/88.22; 704/201
(58) Field of Search ............................... 379/67.1, 88.1, 379/78, 88.16, 142.14, 88.01, 88.02; 704/262, 258, 275, 246–249, 221–223, 201

(56) References Cited

U.S. PATENT DOCUMENTS

| | | | | |
|---|---|---|---|---|
| 5,602,963 A | * | 2/1997 | Bissonnette et al. ........ | 395/2.84 |
| 5,692,100 A | * | 11/1997 | Tsuboka et al. ............. | 704/222 |
| 5,727,047 A | * | 3/1998 | Bentley et al. ............... | 379/93 |
| 5,752,223 A | * | 5/1998 | Aoyagi et al. ............... | 704/219 |
| 6,009,395 A | * | 12/1999 | Lai et al. ..................... | 704/264 |
| 6,058,361 A | * | 5/2000 | Mainard ...................... | 704/220 |
| 6,073,101 A | * | 6/2000 | Maes ........................... | 704/275 |
| 6,076,056 A | * | 6/2000 | Huang et al. ................ | 704/254 |
| 6,119,022 A | * | 9/2000 | Osborn et al. .............. | 455/567 |
| 6,295,340 B1 | * | 9/2001 | Cannon et al. ............. | 379/88.1 |
| 6,463,406 B1 | * | 10/2002 | McCree ....................... | 704/207 |
| 6,507,814 B1 | * | 1/2003 | Gao ............................. | 704/220 |

* cited by examiner

Primary Examiner—Fan Tsang
Assistant Examiner—Ovidio Escalante
(74) Attorney, Agent, or Firm—Synnestvedt & Lechner LLP

(57) ABSTRACT

A telephone answering device including two separate coders, a first coder for encoding/decoding fixed voice prompts spoken by a single speaker, and a second coder for encoding/decoding incoming and outgoing voice messages spoken by multiple speakers. The first coder uses a first set of codebooks trained based on a first set of utterances spoken by a single speaker, while the second coder uses a second set of codebooks trained based on a second set of utterances spoken by multiple speakers. Because the first set of utterances is significantly smaller in size than the second set of utterances, and the range of pitch period is significantly smaller in size for the first set of utterances spoken by a single speaker in comparison to that of the second set of utterances spoken by multiple speakers, the size of the first set of codebooks is significantly reduced relative to the size of the second set of codebooks. As a result, the fixed voice prompt messages may be compressed at a lower bit rate with a relatively high quality of encoding, thereby optimizing the codebook and reducing the amount of necessary memory capacity for storing the encoded fixed voice prompts. The memory required for the encoded first voice prompts is so small that they can be stored in a low cost DSP ROM.

21 Claims, 4 Drawing Sheets

US 6,728,344 B1

EFFICIENT COMPRESSION OF VROM MESSAGES FOR TELEPHONE ANSWERING DEVICES

FIELD OF THE INVENTION

The present invention relates to telephone answering devices, and in particular, a telephone answering device with a first speech coder for encoding/decoding fixed voice prompt messages based on a first set of codebooks and a second speech coder for encoding/decoding incoming and outgoing voice messages based on a second set of codebooks, significantly larger in size than the first codebook.

DESCRIPTION OF RELATED ART

In telecommunication devices, such as digital telephone answering devices (DTADs), speech processing systems are employed to store and forward speech sounds. Conventional digital telecommunication devices provide for the storage and playback of incoming voice messages, outgoing voice messages, and fixed prompt voice messages. Incoming voice messages include messages transmitted over the telephone line by the calling party and recorded by the DTAD. Outgoing messages are the pre-recorded messages played by the DTAD in response to receiving a telephone call. For example, the outgoing message might state "I am presently unavailable. At the sound of the tone please leave a brief message." Incoming and outgoing messages are stored in a read/write memory in the DTAD. These messages are limitless in terms of the number of utterances or phrases that may be expressed and the number of speakers, so long as the memory size is not exceeded. Another type of audio message played by the DTAD is a fixed voice prompt message or "voice read only message" (VROM), such as a date/time stamp, with significantly fewer utterances or phrases spoken by a single speaker. Since the fixed voice prompt messages need only be read, and not changed, they are stored in a read only memory (ROM).

In a conventional DTAD the VROM messages are stored in an external ROM and compressed using the same coding techniques, for example, code-excited linear predictive coding (CELP), used for the storage of incoming and outgoing messages. Alternatively, the VROM messages may be stored on a linear predictive coding (LPC) synthesis chip; however, this provides a lower quality then CELP coding. External voice ROMs or LPC synthesis chips are relatively large in size. The overall size of the circuitry may be reduced by storing the VROM messages in a smaller memory device, such as a digital signal processor read only memory (DSP ROM). However, the cost of the DSP ROM significantly increases as the available storage capacity increases. Thus, it is preferable to use a DSP ROM with a relatively small storage capacity. By way of example, in a 16 k DSP ROM approximately 12 k is used to stored the encoding speech program and other programs, leaving only approximately 4 k words for the fixed voice prompts. The typical total recording time for storing time/day stamp fixed voice prompts is approximately 37 seconds. An encoding rate of 6.8 kbps, which is generally used in DTAD employing a codebook trained for a relatively large number of utterances and speakers, requires at least 15,725 words of storage. Thus, the overall storage requirements for the fixed voice prompts exceed the storage capacity in the typical low cost DSP ROM. Although DSP ROMs having a larger storage capacity, such as 24 k or 32 k, may be used they are significantly more expensive, and thus may be impracticable.

It is therefore desirable to develop a DTAD in which the fixed voice prompts are stored in a DSP ROM at a reduced compression bit rate while maintaining the quality of the reconstructed speech or voice data.

SUMMARY OF THE INVENTION

For the purposes of this invention, the term "set of codebooks" is defined to include an LPC codebook, an adaptive codebook, and a fixed codebook. In addition, the term "voice message" includes both incoming and outgoing voice messages. The terms "voice read only message" and "fixed voice prompt" are synonymous.

The digital telephone answering device in accordance with the present invention includes two separate coders, a first speech coder for encoding/decoding fixed voice prompts spoken by a single speaker and a second coder for encoding/decoding voice messages spoken by multiple speakers. The first speech coder uses a first set of codebooks generated by training on a first set of utterances spoken by a single speaker, while the second speech coder uses a second set of codebooks generated by training on a second set of utterances spoken by multiple speakers. Because the first set of utterances is significantly smaller in size than the second set of utterances, and the range of pitch period is significantly smaller in size for the first set of utterances spoken by a single speaker in comparison to that of the second set of utterances spoken by multiple speakers, the size of the first set of codebooks is significantly reduced relative to the size of the second set of codebooks. As a result, the fixed voice prompt messages may be compressed at a lower bit rate with a relatively high quality of encoding, thereby optimizing the codebook and reducing the amount of memory required for storing the encoded fixed voice prompts. Furthermore, the encoding of fixed voice prompts can occur off line, and thus need not be performed by the DSP in real time. Only decoding of the fixed voice prompts is performed by the DSP in real time.

In addition, the present invention is directed to a method of using the telephone answering device described above. Fixed voice prompts are encoded using a first speech coder having a first set of codebooks generated by training on a first set of utterances spoken by a single speaker. Incoming/outgoing voice messages are encoded using a second speech coder having a second set of codebooks generated by training on a second set of utterances spoken by multiple speakers, wherein the second set of utterances is larger than the first set of utterances. The encoded fixed voice prompts and voice messages are stored in first and second memory devices, respectively, for future retrieval and playback.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE PREFERRED EMBODIMENTS

In conventional CELP coding an input voice or speech signal is represented by parameters that enable reconstruction of the original signal. Two primary sets of parameters are used to represent a speech signal, a short-term predictor parameter and excitation predictor parameters. The short-term predictor parameter includes a linear predictive coding (LPC) parameter, representing a filter which models the frequency shaping effects of the vocal tract for the analyzed signal. On the other hand, excitation parameters concern the excitation of the speech signal and are represented by parameters from two distinct codebooks, an adaptive codebook and a fixed codebook. The adaptive codebook contains the history of the fundamental pitch of the speakers glottal voice excitation, while the fixed codebook contains pre-stored waveform shapes for modeling a broad range of excitation signals.

In DTADs VROM messages as well as voice messages are typically encoded using a single set of codebooks generated by training on a relatively large database of utterances or phrases by a relatively large number of different speakers. It is desirable to store the VROM messages in the DSP ROM in order to reduce the overall size of the circuitry. To ensure that the fixed voice prompt data will fit in the limited space available in the DSP ROM, the encoding bit rate of the VROM messages must be reduced, while not sacrificing the quality of the reconstructed speech signal.

In accordance with the present invention it has been discovered that the bit rate may be reduced by encoding the VROM messages using an independent set of codebooks that are trained for a reduced number of fixed voice prompt utterances or phrases spoken by a single speaker. The set of codebooks used to encode the fixed voice prompts is separate from the set of codebooks used to encode the incoming and outgoing voice messages. In particular, the former is trained on a first set of utterances spoken by a single speaker, while the latter is generated based on a second set of utterances, significantly greater than that of the first set of utterances, spoken by multiple speakers.

The size of the LPC codebook is based on the number of utterances spoken by different speakers. Since the number of utterances for the fixed voice prompts are limited and spoken by a single speaker, the size of the LPC codebook for the VROM messages is significantly reduced relative to the size of each codebook for the voice messages. As a result, the VROM messages may be compressed at a lower bit rate with a relatively high quality of CELP, thereby optimizing the LPC codebook for this reduced set of utterances. Likewise, the adaptive codebook is also dependent on the number of speakers. Since the VROM messages represent the utterances of only a single speaker, the range of pitch period is relatively narrow. Therefore, the number of bits used in the adaptive codebook to represent the voicing information is also significantly reduced.

Figure 1:
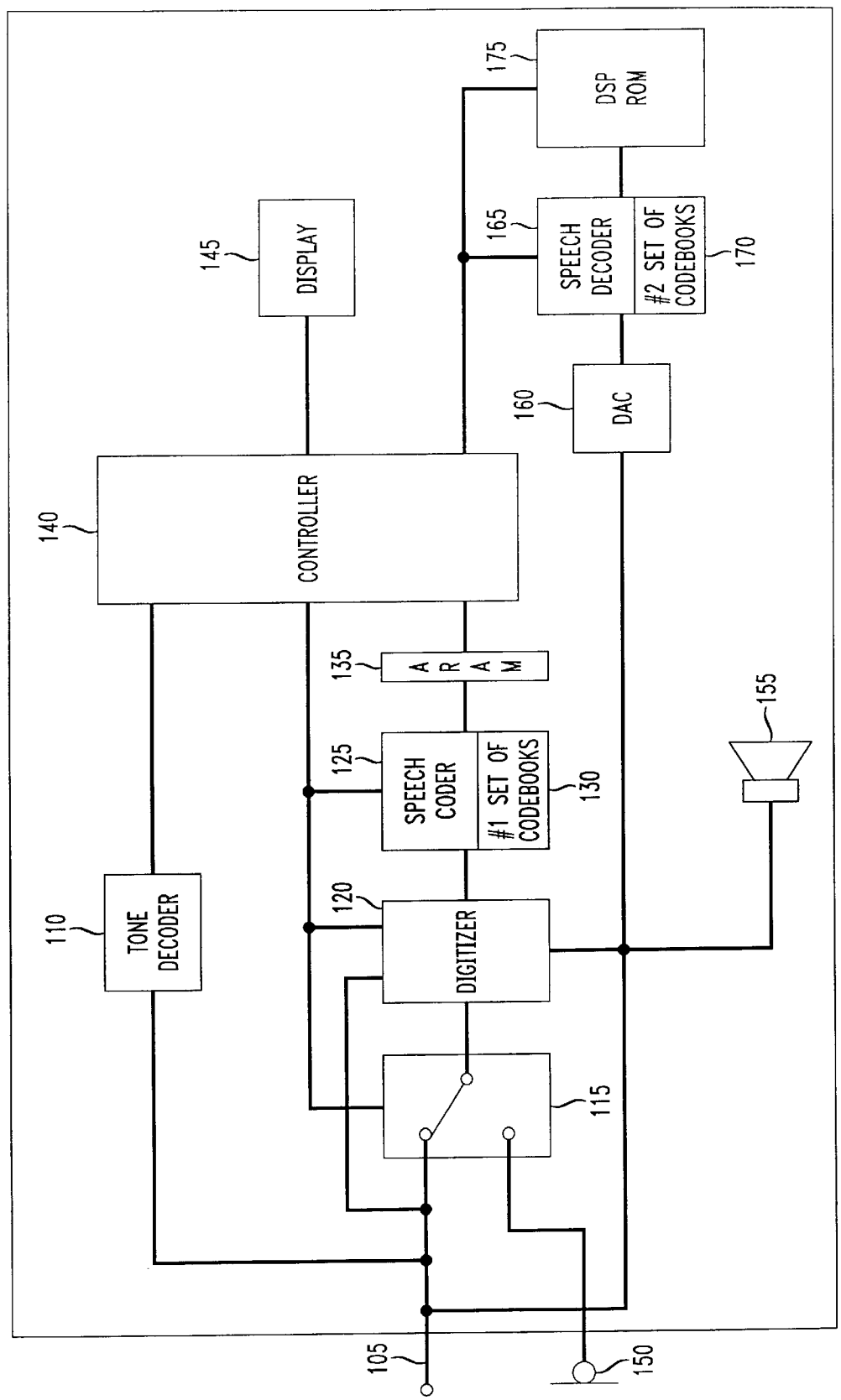
FIG. 1 is a block diagram of an exemplary digital telephone answering device with efficient compression of voice read only messages in accordance with the present invention.

FIG. 1 is an example DTAD 100 with efficient compression of VROM messages in accordance with the present invention. An input of switch 115 is coupled to either a telephone line 105 or a microphone 150. The telephone line 105 is also coupled to a tone decoder 110 for decoding dual tone multi-frequency (DTMF) tones. Tone decoder 110, in turn, is coupled to a controller 140, such as a processor, microprocessor, digital signal processor, or discrete logic circuitry, for controlling the operation of the devices in the DTAD. The output of the switch 115 is connected to a digitizer 120 that serves as both an analog-to-digital (ADC) converter and a digital-to-analog converter (DAC). A first speech coder 125 having a first set of codebooks 130 is connected to the output of the digitizer 120. The output of the speech coder 125 is received by a read/write memory device 135, such as an audio grade random access memory (ARAM), for storing the incoming and outgoing voice messages. Because the incoming and outgoing messages represent a relatively large number of utterances or phases from multiple speakers, the first set of codebooks 130 must be trained for a relatively large number of utterances or phrases spoken by a relatively large number of different speakers. Controller 140 is connected to the switch 115, digitizer 120, first speech coder 125, and ARAM 135 for independently controlling the operations of each device. Digitizer 120 is also connected to a speaker 155 for playback of the voice signals, as described in detail below. A display 145 is connected to the controller for displaying messages, such as the status or mode of the DTAD.

Telephone line 105 is also connected to a digital-to-analog converter (DAC) 160 that is coupled to a second speech coder 165 having a second set of codebooks 170. Although the digitizer 120 and DAC 160 are shown in FIG. 1 as two separate elements, it is within the intended scope of the invention to perform these functions using a single device. Furthermore, a single speech coder device executing the same algorithm but two different codebooks may be used instead of two separate speech coders 125, 165. The output of the second speech coder 165 is connected to a memory device 175, preferably a digital signal processor read only memory (DSP ROM), for storing the encoded fixed voice prompts representing a relatively small number of utterances or phrases (significantly less than the number of utterances in the first codebook set 130) by a single speaker. Controller 140 is connected to the second speech coder 165 and DSP ROM 175 for independently controlling the operation of each device. Because memory device 175 is only used to record fixed voice prompts, the second set of codebooks 170 is trained for a relatively small number of utterances or phrases by a single speaker and thus, is significantly smaller in size than the first set of codebooks 130.

Before being assembled in the DTAD, the coder 165 receives previously generated and stored second speech analog voice input utterances, for example, time of day and days of the week, expressed by a single speaker from the DSP ROM 175, converts them to digital format and encodes them based on the second set of codebooks 170. The compressed or encoded fixed voice prompt data is stored in the DSP ROM 175. Since encoding of the fixed voice prompt messages may be performed off-line, the level of encoding complexity is not a constraining factor.

Figure 2A:
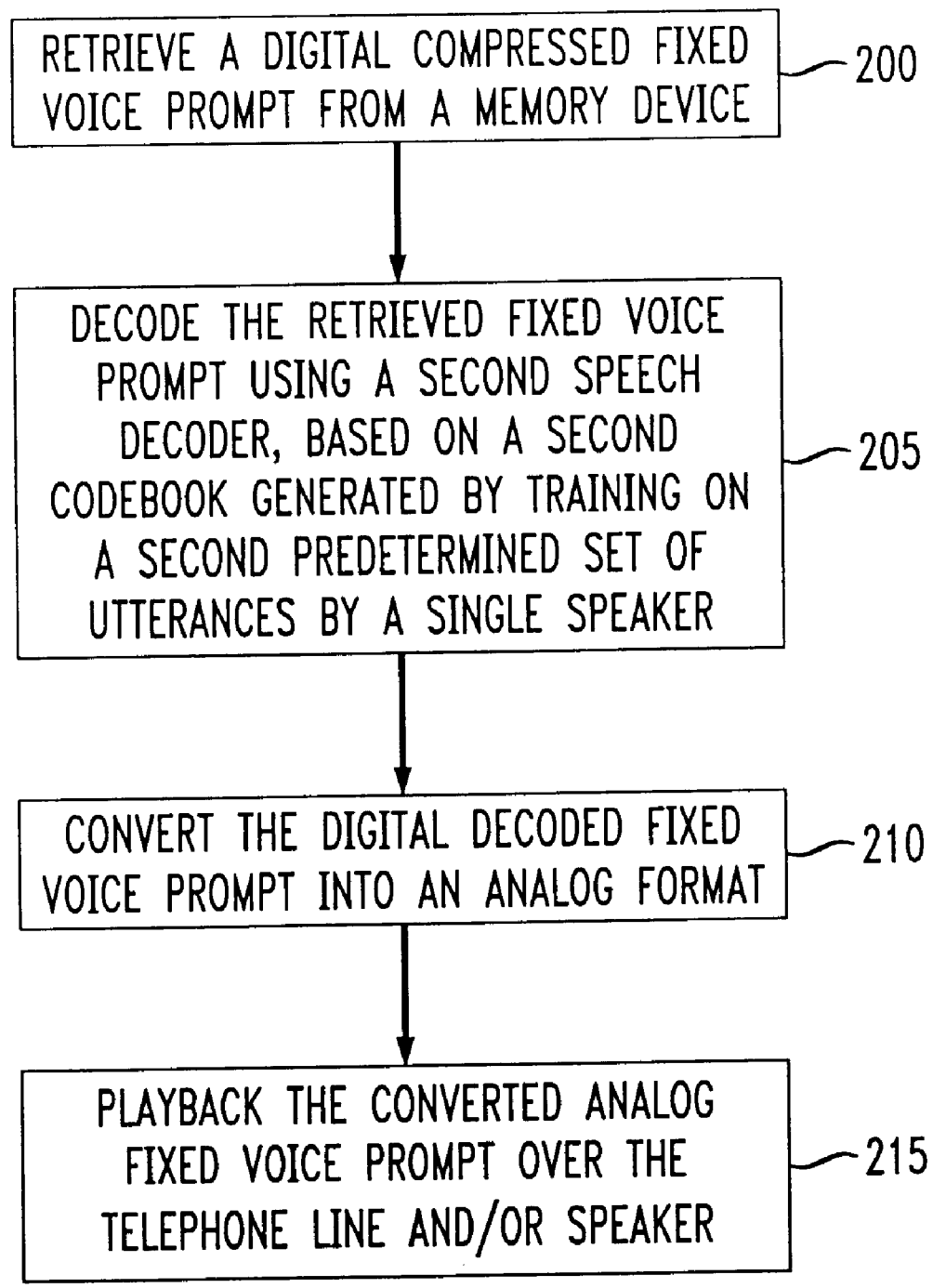
FIG. 2a is a flow chart of the playback operation of a fixed voice prompt using the digital telephone answering device in FIG. 1.
Figure 2B:
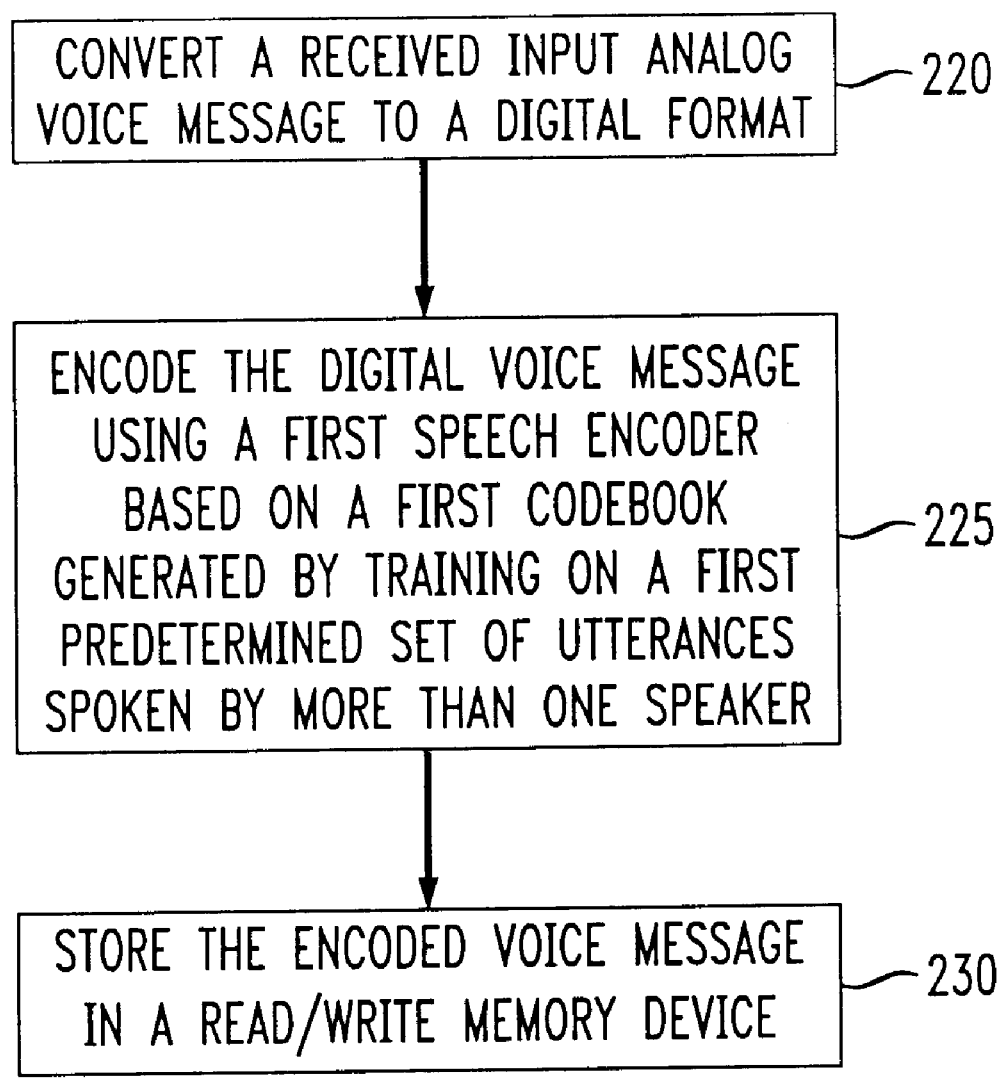
FIG. 2b is a flow chart of the recording operation of an incoming/outgoing voice message using the digital telephone answering device in FIG. 1.
Figure 2C:
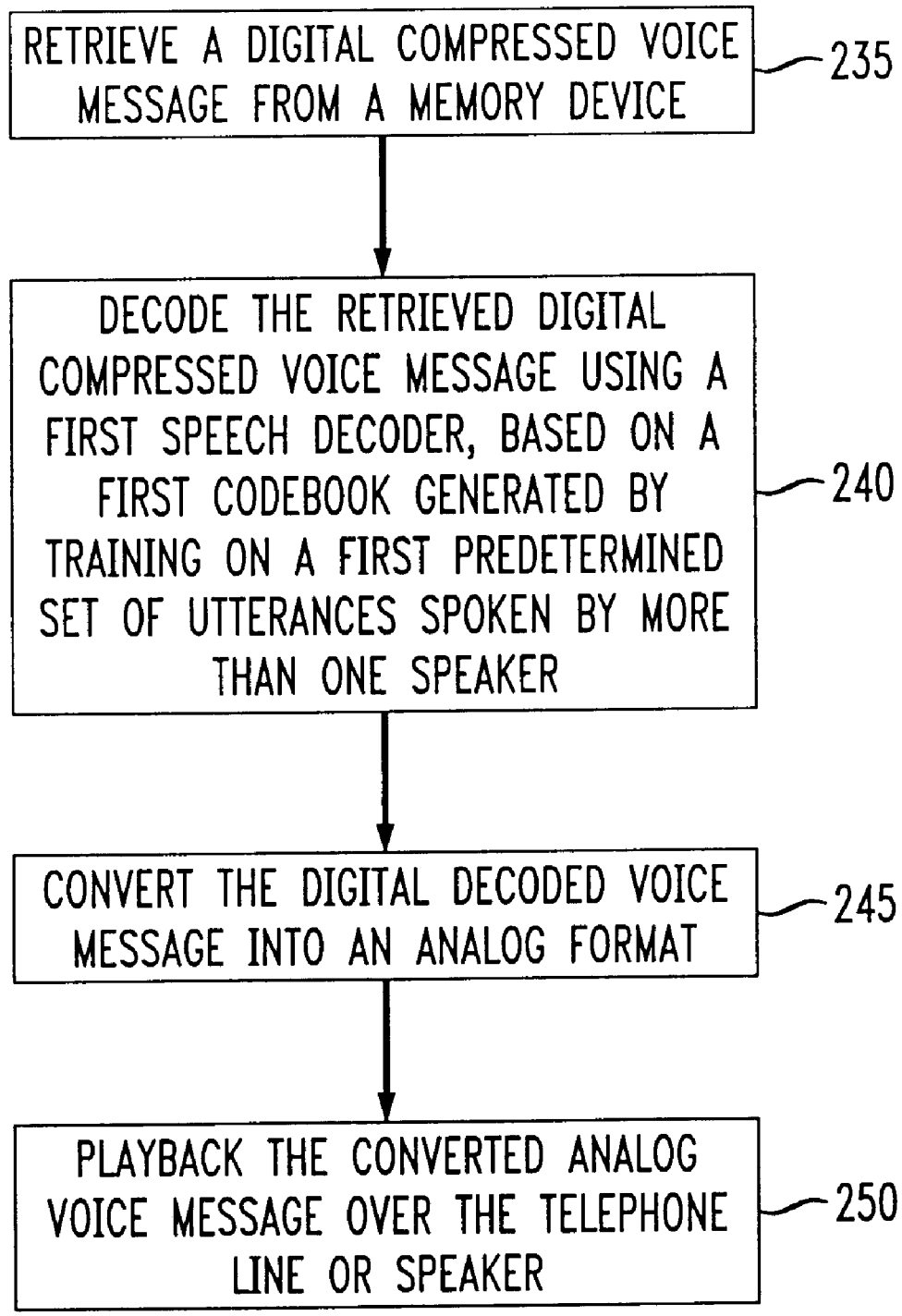
FIG. 2c is a flow chart of the playback operation of an incoming/outgoing voice message using the digital telephone answering device in FIG. 1.

In operation, two general situations may occur, namely the playback of a fixed voice prompt, represented by the exemplary flow chart in FIG. 2a, or the recording and playback of an incoming or outgoing voice message, represented by the exemplary flow chart in FIGS. 2b and 2c, respectively.

In the flow chart in FIG. 2a, compressed fixed voice prompt messages in digital form are retrieved from the DSP ROM 175, in step 200, and decoded, in step 205, by speech coder 165 based on the second set of codebooks 170. The decoded fixed voice prompt is converted, in step 210, using a DAC 160, to analog form and played back over the telephone line 105 and/or speaker 155, in step 215.

The flow chart of the operation of the recording and playback of an incoming or outgoing voice message is shown in FIGS. 2b and 2c, respectively. To record an incoming message, controller 140 couples the input of switch 115 to the telephone line 105. In step 220 of FIG. 2b, the incoming message in analog form is converted by the digitizer 120 to a digital format and transmitted to the first speech coder 125. In step 225, speech coder 125 encodes or compresses the digitized incoming message based on the first set of codebooks 130. Lastly, in step 230, the compressed incoming message is stored in the memory device 135. A similar operation is performed for recording of outgoing messages, except that during the recording of an outgoing message controller 140, in response to a control signal, for example, a control key on the DTAD, couples the input switch 115 to the microphone 150 of the DTAD into which an outgoing message is spoken.

FIG. 2c is a flow chart of the operations for playback of a voice message. During playback the compressed voice message from the ARAM 135 is retrieved from memory 135 in step 235. The retrieved voice message is then decoded, in step 240, by the speech coder 125 based on the first set of codebooks 130 and converted back to analog form, in step 245, by digitizer 120. In step 250, the analog voice messages are played back over the telephone line 105 or speaker 155.

Conventional vector quantization (VQ) techniques may be used to further reduce the size of each codebook while keeping the spectral distortion due to quantization relatively low for the VROM messages. The speech or voice signals are first parsed into a set of vectors. A codebook of code words or templates is generated and each vector is quantized to the closest match of the code words in the codebook. Only the indicies of the best matched code words in the codebook are stored in a memory device. Encoded signals are retrieved from the memory device and reconstructed, for example, using a look-up-table. Since the VROMs are stored off-line, encoding need not occur in real time and thus, relatively complex VQ techniques can be used.

In still a further embodiment, statistics of the various quantized parameters may be collated for the finite set of VROM messages by a single speaker, and Huffman coding may be used to assign bit indices for the various codebooks. Fewer numbers of bits are assigned to codebook entries that are chosen more frequently than for entries that are not chosen as often. Thus, the overall average bit rate of the speech signal can be reduced.

The present invention has been described for digital telephone answering machines but is also applicable to analog telephone answering machines or any other communication system in which speech or voice signals are recorded and fixed voice prompts are used. Although the present invention has been described for a DTAD that compresses the voice signals using a convention CELP coding system, the present DTAD may use any other type of speech coder having a codebook, the size of which is dependent on the number of speakers and the number of utterances or phrases.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A telephone answering device adapted to independently control two different coders comprising:
    a first speech coder for encoding/decoding fixed voice prompts based on a first set of codebooks, said first set of codebooks being trained on a first set of utterances representing fixed voice prompts spoken by a single speaker; and
    a second speech coder for encoding/decoding voice messages based on a second set of codebooks, said second set of codebooks being trained on a second set of utterances spoken by plural speakers, said second set of utterances being larger than said first set of utterances.

2. A telephone answering device in accordance with claim 1, further comprising a digital signal processing read only memory for storing said encoded fixed voice prompts.

3. A telephone answering device in accordance with claim 1, wherein said first set of utterances includes at least one of times of day and days of the week.

4. A telephone answering device in accordance with claim 1, further comprising a random access memory device for storing said encoded voice messages.

5. A telephone answering device in accordance with claim 1, wherein said voice messages include at least one of incoming and outgoing voice messages.

6. A telephone answering device in accordance with claim 1, wherein the size of each of said first and second sets of codebooks is dependent on at least one of a number of utterances and a number of speakers.

7. A telephone answering device in accordance with claim 6, wherein said first and second speech coders are code-excited linear predictive coders.

8. A telephone answering device in accordance with claim 7, wherein said first set of codebooks each include a linear predictive coding codebook, an adaptive codebook, and a fixed codebook.

9. A telephone answering device in accordance with claim 1, wherein said device is a digital telephone answering device.

10. A method for using a telephone answering device adapted to independently control two different coders, comprising the steps of:
    encoding fixed voice prompts using a first speech coder having a first set of codebooks generated by training on a first set of utterances spoken by a single speaker; and
    encoding voice messages using a second speech coder having a second set of codebooks generated by training on a second set of utterances by a plurality of speakers, said second set of utterances being larger than said first set of utterances.

11. A method in accordance with claim 10, further comprising the step of storing the encoded fixed voice prompts in a first memory device and the encoded voice messages in a second memory device.

12. A method in accordance with claim 11, wherein said first memory device is a digital signal processor read only memory device.

13. A method in accordance with claim 10, wherein said fixed voice prompts include at least one of times of the day and days of the week.

14. A method in accordance with claim 11, wherein said second memory device is a random access memory device.

15. A method in accordance with claim 10, wherein the voice messages include at least one of incoming and outgoing voice messages.

16. A method in accordance with claim 10, wherein the size of each of said first and second sets of codebooks is dependent on at least one of a number of utterances and a number of speakers.

17. A method in accordance with claim 16, wherein said first and second speech coders are code-excited linear predictive coders.

18. A method in accordance with claim 17, wherein said first and second sets of codebooks each include a linear predictive coding codebook, an adaptive codebook, and a fixed codebook.

19. A method in accordance with claim 10, wherein said device is a digital telephone answering device.

20. A method in accordance with claim 11, further comprising the steps of:

retrieving an encoded fixed voice prompt from said first memory device;

decoding the retrieved fixed voice prompt using said first speech coder; and playing back the decoded fixed voice prompt over at least one of a telephone line and a speaker.

21. A method in accordance with claim 20, further comprising the steps of:

retrieving an encoded voice message from said second memory device;

decoding the retrieved encoded voice message using said second speech coder; and playing back the decoded voice message over at least one of the telephone line and the speaker.

\* \* \* \* \*